United States Patent
Suzuki et al.

(10) Patent No.: US 8,324,143 B2
(45) Date of Patent: Dec. 4, 2012

(54) CLEANING AGENT FOR ELECTRONIC MATERIALS

(75) Inventors: Kazumitsu Suzuki, Kyoto (JP); Shohei Sato, Kyoto (JP); Ayayo Sugiyama, Kyoto (JP)

(73) Assignee: Sanyo Chemical Industries, Ltd., Kyoto-shi (JP)

( * ) Notice: Subject to any disclaimer, the term of this patent is extended or adjusted under 35 U.S.C. 154(b) by 0 days.

(21) Appl. No.: 13/139,235

(22) PCT Filed: Nov. 25, 2009

(86) PCT No.: PCT/JP2009/006359
§ 371 (c)(1), (2), (4) Date: Jun. 10, 2011

(87) PCT Pub. No.: WO2010/070819
PCT Pub. Date: Jun. 24, 2010

(65) Prior Publication Data
US 2011/0245127 A1 Oct. 6, 2011

(30) Foreign Application Priority Data
Dec. 19, 2008 (JP) .................. 2008-323080

(51) Int. Cl.
*C11D 3/60* (2006.01)
(52) U.S. Cl. .......... 510/175; 510/492; 510/495; 134/1.3
(58) Field of Classification Search ............... 510/175, 510/492, 495; 134/1.3
See application file for complete search history.

(56) References Cited

U.S. PATENT DOCUMENTS

| | | | |
|---|---|---|---|
| 6,117,220 A | 9/2000 | Kodama et al. | |
| 6,551,985 B1 | 4/2003 | Bianchetti et al. | |
| 6,680,286 B1 * | 1/2004 | Kawaguchi et al. | 510/434 |
| 6,830,872 B2 * | 12/2004 | Mizutani et al. | 430/276.1 |
| 7,033,725 B2 * | 4/2006 | Kawauchi et al. | 430/270.1 |
| 7,041,628 B2 * | 5/2006 | Sunder et al. | 510/223 |
| 7,153,816 B2 * | 12/2006 | Kessler et al. | 510/220 |
| 7,192,911 B2 * | 3/2007 | Sunder et al. | 510/223 |
| 7,375,070 B2 * | 5/2008 | Pegelow et al. | 510/296 |
| 7,704,939 B2 * | 4/2010 | Suzuki et al. | 510/436 |
| 7,833,359 B2 * | 11/2010 | Suzuki et al. | 134/42 |
| 2003/0170559 A1 * | 9/2003 | Mizutani et al. | 430/270.1 |
| 2004/0038154 A1 | 2/2004 | Muramatsu et al. | |
| 2004/0259751 A1 * | 12/2004 | Kessler et al. | 510/293 |
| 2007/0167343 A1 * | 7/2007 | Suzuki et al. | 510/329 |
| 2009/0011972 A1 * | 1/2009 | Suzuki et al. | 510/421 |
| 2009/0233828 A1 * | 9/2009 | Suzuki et al. | 510/218 |
| 2010/0075251 A1 * | 3/2010 | Fujii et al. | 430/270.1 |
| 2010/0081090 A1 * | 4/2010 | Arimura | 430/302 |
| 2011/0245127 A1 * | 10/2011 | Suzuki et al. | 510/163 |

FOREIGN PATENT DOCUMENTS

| | | |
|---|---|---|
| JP | 5-138142 A | 6/1993 |
| JP | 6-41770 A | 2/1994 |
| JP | 2000-144193 A | 5/2000 |
| JP | 2000-309796 A | 11/2000 |
| JP | 2001-007071 A | 1/2001 |
| JP | 2001-206737 A | 7/2001 |
| JP | 2001-522396 A | 11/2001 |
| JP | 2003-151126 A | 5/2003 |
| JP | 2004-133384 A | 4/2004 |
| JP | 2004-145958 A | 5/2004 |
| JP | 2009-87523 A | 4/2009 |

* cited by examiner

*Primary Examiner* — Gregory Webb
(74) *Attorney, Agent, or Firm* — Westerman, Hattori, Daniels & Adrian, LLP

(57) ABSTRACT

Provided is a cleaning agent for electronic materials, which enables very efficient advanced cleaning such that yield in the production of the electronic materials is improved and cleaning in a short period of time becomes possible, the cleaning agent having excellent cleaning power for fine-grained particles and organic matter and being able to reduce metallic contamination on the substrate. The cleaning agent for electronic materials comprises sulfamic acid (A), an anionic surfactant having at least one sulfonic acid group or a salt thereof in the molecule (B), a chelating agent (C), and water, wherein the pH at 25 C is preferably not more than 3.0 and the (B) is preferably a polymeric anionic surfactant (B1) having a weight average molecular weight of 1,000 to 2,000,000.

12 Claims, No Drawings

CLEANING AGENT FOR ELECTRONIC MATERIALS

TECHNICAL FIELD

The present invention relates to a cleaning agent for electronic materials. More particularly, the invention relates to a cleaning agent for electronic materials, which has an excellent ability to remove fine particles on the electronic materials without contaminating the electronic materials and without fear of causing corrosion of the production facilities.

BACKGROUND ART

In the cleaning technology for electronic materials represented by a magnetic disk substrate, flat panel display substrate, semiconductor substrate, and the like, control of the cleaning step has become very important because, with progress in the microfabrication technology typified by VLSI and the like, trace amounts of impurities and organic matter remaining on the electronic materials, especially substrates, have great influence on the performance and yield of the devices. In particular, the particles themselves, which are the target of the cleaning, tend to become fine-grained in recent years and the fine-grained particles become more liable to adhere to the interface. Therefore, establishment of an advanced cleaning technology has become a matter of urgent need.

In order to prevent contamination by these particles, there have been proposed methods such as lowering zeta potential on the particle surface by addition of surfactants and thereby reducing the particle adhesion (refer to PTLs 1 to 3).

CITATION LIST

Patent Literature

[PTL 1] Japanese Patent Laid-Open Publication No. H5-138142
[PTL 2] Japanese Patent Laid-Open Publication No. H6-41770
[PTL 3] Japanese Patent Laid-Open Publication No. 2001-7071

SUMMARY OF INVENTION

Technical Problem

However, because the surfactant proposed in the above-cited PTL 1 is a nonionic surfactant, it cannot lower the zeta potential on the particle surface sufficiently and its ability to prevent readhesion of the particles is unsatisfactory. Further, the surfactant proposed in the above-cited PTL 2 is an anionic surfactant and it does provide a certain degree of improvement in prevention of particle readhesion by lowering the zeta potential on the particle surface. However, its ability to remove the fine-grained particles is not enough.

Furthermore, in order to reduce metallic contamination on the substrate, PLT 3 mentioned above proposes an acidic cleaning agent comprising an organic acid and a surfactant. However, a problem exists that this cleaning agent forms salts easily with trace amounts of metals (calcium, magnesium, and the like) during cleaning, the salts being hardly soluble in water, and these precipitated salts contaminate the substrate.

The object of the present invention is to provide a cleaning agent for electronic materials, which enables very efficient advanced cleaning such that yield in the production of the electronic materials is improved and cleaning in a short period of time becomes possible, the cleaning agent having excellent cleaning power for fine-grained particles and being able to reduce metallic contamination on the substrate.

Solution to Problem

The present inventors conducted diligent research in order to solve the problem described above and, as a result, reached the present invention. That is, the present invention is a cleaning agent for electronic materials comprising sulfamic acid (A), an anionic surfactant having at least one sulfonic acid group or a salt thereof in the molecule (B), a chelating agent (C), and water as essential components; and a method for producing electronic materials, comprising a step of cleaning the electronic materials by using the cleaning agent.

Advantageous Effects of Invention

The cleaning agent for electronic materials of the present invention has effects that it provides excellent ability of preventing readhesion of particles to the electronic materials and removing the fine-grained particles, both being the traditional problems in the cleaning step, and thus it can improve reliability of the device and fabrication yield thereof.

Furthermore, the cleaning agent for electronic materials of the present invention also provides effects that there is relieves the fear of secondary contamination by the cleaning agent because there is no formation of a water-insoluble material during cleaning due to a reaction of the cleaning agent with trace amounts of metal ions present in water and that it does not corrode the metal components which are used in the production facilities.

DESCRIPTION OF EMBODIMENTS

Sulfamic acid (A) in the present invention is not particularly limited and can be either a reagent or an industrial raw material, which are generally commercially available; also it can be in a form of either powder or aqueous solution.

The anionic surfactant having at least one sulfonic acid group or a salt thereof in the molecule (B) includes a polymeric anionic surfactant (B1) having a weight average molecular weight (hereinafter abbreviated as Mw) of 1,000 to 2,000,000, comprising two or more repeating units in one molecule, and a low-molecular-weight anionic surfactant (B2).

Specific examples of the above-mentioned polymeric anionic surfactant (B1) include polystyrenesulfonic acid, styrene/styrenesulfonic acid copolymer, poly{2-(meth)acryloylamino-2,2-dimethylethanesulfonic acid}, 2-(meth)acryloylamino-2,2-dimethylethanesulfonic acid/styrene copolymer, 2-(meth)acryloylamino-2,2-dimethylethanesulfonic acid/acrylamide copolymer, 2-(meth)acryloylamino-2,2-dimethylethanesulfonic acid/(meth)acrylic acid copolymer, 2-(meth)acryloylamino-2,2-dimethylethanesulfonic acid/(meth)acrylic acid/acrylamide copolymer, 2-(meth) acryloylamino-2,2-dimethylethanesulfonic acid/styrene/acryamide copolymer, 2-(meth) acryloylamino-2,2-dimethylethanesulfonic acid/styrene/(meth)acrylic acid copolymer, naphthalenesulfonic acid-formaldehyde condensate, methylnaphthalenesulfonic acid-formaldehyde condensate, dimethylnaphthalenesulfonic acid-formaldehyde condensate, anthracenesulfonic acid-formaldehyde condensate, melaminesulfonic acid-formaldehyde condensate, anilinesulfonic acid-phenol-formaldehyde condensate, salts thereof, and the like.

Specific examples of the low-molecular-weight anionic surfactant (B2) include sulfosuccinic acid mono- or di-ester (salt) of alcohols having 6 to 24 carbon atoms {dioctyl sulfosuccinic acid (salt) and the like}, sulfonated materials (salts) of—olefins having 8 to 24 carbon atoms, alkylbenzene sulfonic acid (salt) comprising an alkyl group having 8 to 14 carbon atoms [octylbenzenesulfonic acid (salt), dodecyl benzenesulfonic acid (salt), and the like], petroleum sulfonates (salts), toluenesulfonic acid (salt), xylene sulfonic acid (salt), cumenesulfonic acid (salt), and the like.

Of these, from a viewpoint of particle removing ability and low-foaming property, preferable is the polymeric anionic surfactant (B1), more preferable are polystyrenesulfonic acid, poly{2-(meth)acryloylamino-2,2-dimethylethanesulfonic acid}, 2-(meth)acryloylamino-2,2-dimethylethanesulfonic acid/(meth)acrylic acid copolymer, naphthalenesulfonic acid-formaldehyde condensate, and salts thereof. Even more preferable are polystyrene sulfonic acid, poly{2-(meth)acryloylamino-2,2-dimethylethanesulfonic acid}, 2-(meth) acryloylamino-2,2-dimethylethanesulfonic acid/(meth)acrylic acid copolymer, and salts thereof, and particularly preferable are polystyrenesulfonic acid, 2-(meth) acryloylamino-2,2-dimethylethanesulfonic acid/(meth)acrylic acid copolymer, and salts thereof.

When the sulfonic acid group in the anionic surfactant (B) forms a salt, the salt includes, for example, alkali metal salts, alkaline earth metal salts, ammonium salts, quaternary ammonium salts having 4 to 25 carbon atoms, aliphatic amine salts having 1 to 36 carbon atoms, amidine salts having 4 to 10 carbon atoms, alkanolamine salts having 1 to 23 carbon atoms, and aromatic or aralkylamine salts having 6 to 20 carbon atoms. Further, (B) may be used alone or in a combination of two or more kinds.

Of these, from a viewpoint of particle removing ability, preferable are alkali metal salts, ammonium salts, quaternary ammonium salts having 4 to 25 carbon atoms, aliphatic amine salts having 1 to 36 carbon atoms, amidine salts having 4 to 10 carbon atoms, and alkanol amine salts having 1 to 23 carbon atoms. Also, from a viewpoint of metallic contamination on the substrate, more preferable are ammonium salts, quaternary ammonium salts having 4 to 25 carbon atoms, aliphatic amine salts having 1 to 36 carbon atoms, amidine salts having 4 to 10 carbon atoms, and alkanolamine salts having 1 to 23 carbon atoms. Particularly preferable are aliphatic amine salts having 1 to 36 carbon atoms, amidine salts having 4 to 10 carbon atoms, and alkanolamine salts having 1 to 23 carbon atoms, the most preferable being salts of DABCO, DBU, DBN, 1H-imidazole, 2-methyl-1H-imidazole, 2-ethyl-1H-imidazole, monoethanolamine, diethanolamine, triethanolamine, N-methyldiethanolamine, 2-amino-2-methyl-1-propanol, and 3-amino-1-propanol.

The anionic surfactant (B) may be either in a form of acid or forming a salt. However, from a viewpoint of industrial availability, the surfactant is preferably in a form of salt.

From a viewpoint of ability to prevent particle readhesion and of low foaming property, and the like, the Mw of the polymeric anionic surfactant (B1) is generally 1,000 to 2,000,000, preferably 1,200 to 1,000,000, more preferably 1,500 to 80,000, and particularly preferably 2,000 to 50,000.

Meanwhile, the Mw and number average molecular weight in the present invention are measured by gel permeation chromatography (hereinafter abbreviated as GPC) at 40 C with polyethylene oxide as the standard material. Specifically, measurements are made by using an instrument main body: HLC-8120 (produced by Tosoh Corporation), column: TSK-gel 6000, G3000 PWXL (produced by Tosoh Corporation), detector: differential refractometer detector built in the instrument main body, eluent: 0.5% sodium acetate in water/methanol (70/30 v/v), eluent flow rate: 1.0 mL/min., column temperature: 40 C, sample: 0.25% solution in the eluent, amount of sample injected: 200 L, standard material: TSK STANDARD POLYETHYLENE OXIDE produced by Tosoh Corporation, and data treatment software: GPC 8020 model II (produced by Tosoh Corporation).

Unless particularly specified in the above and the following, % refers to the weight %.

The method for producing the polymeric anionic surfactant (B1) includes heretofore known methods such as:
(1) a method of production by radical polymerization by using an unsaturated monomer comprising a sulfonic acid group,
(2) a method of production by introduction of sulfonic acid groups into the polymeric compound, and
(3) a method of production by a polycondensation reaction with formaldehyde by using an aromatic compound comprising a sulfonic acid group in the molecule,
as described in the following.

(1) The Method of Production by Radical Polymerization by Using an Unsaturated Monomer Comprising a Sulfonic Acid Group:

By using monomers comprising an unsaturated monomer having a sulfonic acid group [styrenesulfonic acid, 2-(meth) acryloylamino-2,2-dimethylethanesulfonic acid, and the like] and, if necessary, other unsaturated monomers (styrene, acrylic acid, acrylamide, and the like) and a radical initiator (persulfate salts, azobisamidinopropane salts, azobisisobutyronitrile, and the like) in an amount of 0.1 to 30% relative to the monomer, polymerization is carried out in a solvent such as water or alcohol-type solvent at a temperature of 30 to 150 C. If necessary, a chain transfer agent such as mercaptans may be used.

(2) A Method of Production by Introduction of Sulfonic Acid Groups into the Polymeric Compound:

There may be mentioned a method (hereinafter described as sulfonation) wherein, after a polymeric compound comprising unsaturated bonds (polystyrenesulfonic acid and the like) is obtained by the method (1) described above and the like, sulfonic acid groups are introduced into the polymeric compound by the following method.

As a method for sulfonation reaction, for example, after addition of a reaction solvent (a solvent inert to sulfonation such as 1,2-dichloroethane, methylene dichloride, ethyl chloride, carbon tetrachloride, 1,1-dichloroethane, 1,1,2,2-tetrachloroethane, chloroform, and ethylene dibromide) and a sulfonating agent (anhydrous sulfuric acid, chlorosulfonic acid, and the like), the polymeric compound is reacted at 0 to 50 C and, if necessary, by filtering or distilling off the solvent, there can be obtained a polymeric compound having sulfonic acid groups introduced thereinto. Hereat, the amount (molar ratio) of the sulfonating agent used relative to the number of moles of the unsaturated monomers which constitute the polymeric compound is preferably 0.5 to 3, more preferably 1 to 2.5. The amount (weight %) of the solvent used is, even though it depends on the molecular weight of the polymeric compound, generally 1 to 30, preferably 2 to 20 relative to the raw material polymeric compound.

The degree of sulfonation (mole %) per structural monomer unit of the polymeric compound obtained is preferably 50 to 100, more preferably 80 to 99, from a viewpoint of solubility in water and the like. In addition, the degree of sulfonation is a measure of how many sulfonic acid groups are introduced per monomer unit which constitute the polymer compound. For example, in the case of sulfonated polystyrene, the degree of sulfonation of 100% means that one sulfonic acid group has been introduced into each of all aromatic rings of polystyrene. The degree of sulfonation can be obtained by known methods, which include, for example, a method to measure the ratio of carbon atom to sulfur atom by elemental analysis or a method to measure the amount of combined sulfuric acid ("quantitative analysis of anionic surfactants" in JIS K3362:1998, which corresponds to ISO 2271).

(3) A Method of Production by a Polycondensation Reaction with Formaldehyde by Using an Aromatic Compound Comprising a Sulfonic Acid Group in the Molecule:

There may be mentioned a method wherein an aromatic compound having a sulfonic acid group (naphthalenesulfonic acid, anthracenesulfonic acid, methylnaphthalenesulfonic acid, and the like), other compounds if necessary (naphthalene, phenol, cresol, and the like), urea, and an acid (sulfuric acid and the like) or an alkali (sodium hydroxide and the like) used as a catalyst are charged to a reaction vessel, a prescribed amount of an aqueous formalin solution (for example, a 37 weight % aqueous solution) is dropwise added thereto over 1 to 4 hours under agitation at 70 to 90 C, and, after the dropwise addition, the reaction mixture is stirred under reflux for 3 to 30 hours, followed by cooling.

The chelating agent (C) used in the cleaning agent for electronic materials of the present invention includes aminopolycarboxylic acid (salt) (C1), hydroxycarboxylic acid (salt) (C2), cyclocarboxylic acid (salt) (C3), ethercarboxylic acid (salt) (C4), other carboxylic acid (salt) (C5), phosphonic acid (salt) (C6), condensed phosphoric acid (salt) (C7), and the like.

The aminopolycarboxylic acid (salt) (C1) includes, for example, ethylenediaminetetraacetic acid (EDTA) (salt), diethylenetriaminepentaacetic acid (DTPA) (salt), triethylenetetraminehexaacetic acid (TTHA) (salt), hydroxyethylethylenediaminetriacetic acid (HEDTA) (salt), dihydroxyethylethylenediaminetetraacetic acid (DHEDDA) (salt), nitrilotriacetic acid (NTA) (salt), hydroxyethyliminodiacetic acid (HIDA) (salt), -alaninediacetic acid (salt), aspartic diacetic acid (salt), methylglycinediacetic acid (salt), iminodisuccinic acid (salt), serinediacetic acid (salt), hydroxyiminodisuccinic acid (salt), dihydroxyethylglycine (salt), aspartic acid (salt), glutamic acid (salt), and the like.

The hydroxycarboxylic acid (salt) (C2) includes, for example, hydroxyacetic acid (salt), lactic acid (salt), tartaric acid (salt), malic acid (salt), hydroxybutyric acid (salt), glyseric acid (salt), citric acid (salt), gluconic acid (salt), L-ascorbic acid (salt), isoascorbic acid (salt), erythorbic acid (salt), salicylic acid (salt), gallic acid (salt), and the like.

The cyclocarboxylic acid (salt) (C3) includes, for example, pyromellitic acid (salt), benzopolycarboxylic acid (salt), cyclopentanetetracarboxykic acid (salt), and the like.

The ethercarboxylic acid (salt) (C4) includes, for example, carboxymethyl tartronate, carboxymethyl oxysuccinate, oxydisuccinate, tartaric acid monosuccinate, tartaric acid disuccinate, and the like.

The other carboxylic acid (salt) (C5) includes, for example, maleic acid (salt), fumaric acid (salt), oxalic acid (salt), and the like.

The phosphonic acid (salt) (C6) includes, for example, methyldiphosphonic acid (salt), aminotri(methylenephosphonic acid) (salt), 1-hydroxyethylidene-1,1-diphosphonic acid (salt), ethylenediaminetetra(methylenephosphonic acid) (salt), hexamethylenediaminetetra(methylenephosphonic acid) (salt), propylenediaminetetra(methylenephosphonic acid) (salt), diethylenetriaminepenta(methylenephosphonic acid) (salt), triethylenetetraminehexa(methylenephosphonic acid) (salt), triaminotriethylaminehexa(methylenephosphonic acid) (salt), trans-1,2-cyclohexanediaminetetra(methylenephosphonic acid) (salt), glycoletherdiaminetetra(methylenephosphonic acid) (salt), tetraethylenepentaminehepta (methylenephosphonic acid) (salt), and the like.

The condensed phosphoric acid (salt) (C7) includes, for example, pyrophosphoric acid (salt), metaphosphoric acid (salt), tripolyphosphoric acid (salt), hexametaphosphoric acid (salt), and the like.

The chelating agent (C) may be used as either an acid or neutralized salt. In addition, when the chelating agent (C) forms a salt, the salt includes those comprising the same cationic components as exemplified in the salt of the anionic surfactant (B) described above. Further, these chelating agents may be used alone or in combination of two or more kinds.

Of these, from a viewpoint of particle removing ability, preferable are (C1), (C2), (C6), (C7), and salts thereof; more preferable are (C1), (C6), (C7), and salts thereof. Particularly preferable are ethylenediaminetetraacetic acid (EDTA) (salt), diethylenetriaminepentaacetic acid (DTPA) (salt), dihydroxyethylethylenediaminetetraacetic acid (DHEDDA) (salt), nitrilotriacetic acid (NTA) (salt), hydroxyethyliminodiacetic acid (HIDA) (salt), aspartic acid diacetic acid (salt), aspartic acid (salt), glutamic acid (salt), 1-hydroxyethylidene-1,1-diphosphonic acid (salt), ethylenediaminetetra (methylenephosphonic acid) (salt), metaphosphoric acid (salt), and hexametaphosphoric acid (salt). The most preferable are diethylenetriaminepentaacetic acid (DTPA) (salt), dihydroxyethylethylenediaminetetraacetic acid (DHEDDA) (salt), nitrilotriacetic acid (NTA) (salt), hydroxyethyliminodiacetic acid (HIDA) (salt), 1-hydroxyethylidene-1,1-diphosphonic acid (salt), and ethylenediaminetetra(methylenephosphonic acid) (EDTMP) (salt).

From a viewpoint of preventing secondary contamination by metallic impurities, the water in the present invention particularly preferably includes ion-exchanged water (electrical conductivity: 0.2 S/cm or less) or ultrapure water (electrical resistivity: 18 M cm or higher).

Meanwhile, in description of the present invention on the component content in terms of parts, ingredients other water are defined as the active ingredients.

From a viewpoint of cleaning ability, the content of (A) in the cleaning agent of the present invention is preferably 5 to 90%, more preferably 10 to 85%, and particularly preferably 20 to 60%, based on the weight of the active ingredients of the cleaning agent.

From a viewpoint of cleaning ability, the content of (B) in the cleaning agent of the present invention is preferably 0.1 to 50%, more preferably 1 to 30%, and particularly preferably 3 to 25%, based on the weight of the active ingredients of the cleaning agent.

From a viewpoint of cleaning ability, the content of (C) in the cleaning agent of the present invention is preferably 0.1 to 50%, more preferably 0.5 to 40%, and particularly preferably 1 to 30%, based on the weight of the active ingredients of the cleaning agent.

Furthermore, particularly from a viewpoint of particle removing ability, the weight ratio of (B) relative to (C), [(B)/(C)], is preferably 0.1 to 7, more preferably 0.1 to 5, particularly preferably 0.2 to 2, and most preferably 0.3 to 1.

From a viewpoint of cleaning ability, the concentration of the active ingredients of the cleaning agent of the present invention at the time of use is preferably 0.01 to 50 weight %, more preferably 0.05 to 20 weight %, and particularly preferably 0.1 to 5 weight %.

From a viewpoint of ability to clean the particles and organic materials and to remove the metallic contamination, the pH of the cleaning agent of the present invention at 25 C is preferably 3.0 or lower, particularly preferably 2.5 to 0.5, and most preferably 2.0 to 0.8.

The cleaning agent of the present invention can further comprise, in a range in which the effect is not impaired, one or more components selected from the group consisting of a hydrophilic organic solvent (D), surfactant (E) other than the anionic surfactant comprising a sulfonic acid group or salt thereof (B), trivalent or more polyhydric alcohol, reducing agent, and other additives.

The hydrophilic solvent (D) has effects of improving the product stability and rinse-off property of the cleaning agent. (D) includes an organic solvent, the solubility of which in water, [(D)/100 g H2O], at 20 C is 3 or more, preferably 10 or more. Specific examples of (D) include sulfoxides (dimethyl sulfoxide and the like), sulfones {dimethyl sulfone, diethyl sulfone, bis(2-hydroxyethyl) sulfone, sulfolane, 3-methylsulfolane, 2,4-dimethylsulfolane, and the like}, amides {N,N-dimethylformamide, N-methylformamide, N,N-dimethylacetamide, N,N-dimethylpropionamide, and the like}, lactams {N-methyl-2-pyrrolidone, N-ethyl-2-pyrrolidone, N-hydroxymethyl-2-pyrrolidone, and the like}, lactones {-propiolactone, -butyrolactone, -butyrolactone, -valerolactone, and -valerolactone, and the like}, alcohols {methanol, ethanol, isopropanol, and the like}, glycol and glycol ethers {ethylene glycol, ethylene glycol monomethyl ether, triethylene glycol monomethyl ether, ethylene glycol monoethyl ether, diethylene glycol, diethylene glycol monomethyl ether, diethylene glycol monoethyl ether, diethylene glycol monobutyl ether, diethylene glycol monohexyl ether, propylene glycol, propylene glycol monomethyl ether, dipropylene glycol monomethyl ether, butylene glycol, diethylene glycol dimethylether, diethylene glycol diethyl ether, triethylene glycol dimethyl ether, triethylene glycol diethyl ether, and the like}, oxazolidinones (N-methyl-2-oxazolidinone, 3,5-dimethyl-2-oxazolidinone, and the like), nitriles (acetonitrile, propionitrile, butyronitrile, acrylonitrile, methacrylonitrile, and the like), carbonates (ethylene carbonate, propylene carbonate, and the like), ketones (acetone, diethyl ketone, acetophenone, methyl ethyl ketone, cyclohexanone, cyclopentanone, diacetone alcohol, and the like), cyclic ethers (tetrahydrofuran, tetrahydropyran, and the like), and the like. (D) may be used alone or in combination of two or more kinds.

Among (D), from a viewpoint such as the rinse-off property, preferable are glycols and glycol ethers, more preferably ethylene glycol monomethyl ether, diethylene glycol monomethyl ether, triethylene glycol monomethyl ether, diethylene glycol monobutyl ether, and diethylene glycol monohexyl ether.

For the purpose of improving the rinse-off property of the cleaning agent of the present invention, the content of the hydrophilic solvent (D) is preferably 1 to 70 weight %, more preferably 5 to 50 weight %, and particularly preferably 10 to 40 weight %, based on the weight of the active ingredients of the cleaning agent.

For the purposes of improving the wetting ability and dispersing ability of the cleaning agent on the electronic substrate, it is desirable for the cleaning agent of the present invention to further comprise a nonionic surfactant (E).

Such a nonionic surfactant (E) includes an alkylene oxide adduct (E1) of a higher alcohol, phenol, alkylphenol, aliphatic acid, aliphatic amine, and the like; an aliphatic acid ester of an alcohol (E2); and an aliphatic acid alkanolamide (E3).

(E1) includes alkylene (having 2 to 4 carbon atoms) oxide adducts (the number of moles added: 1 to 30) of higher alcohols, alkylene oxide adducts (the number of moles added: 1 to 30) of phenol or alkylphenols, ethylene oxide adducts (the number of moles added: 1 to 30) of higher aliphatic acids, alkylene oxide adducts (the number of moles added: 1 to 30) of aliphatic amines, alkylene oxide adducts (the number of moles added: 5 to 200) of alkylene glycols, ethylene oxide adducts (the number of moles added: 1 to 100) of polyoxypropylene glycols (number average molecular weight: 200 to 4,000), propylene oxide adducts (the number of moles added: 1 to 100) of polyoxyethylene glycols (number average molecular weight: 200 to 4,000), and alkyl (having 1 to 20 carbon atoms) allyl ethers of polyoxyethylene glycols (number average molecular weight: 60 to 2,000); ethylene oxide adducts (the number of moles added: 1 to 30) of aliphatic acid (having 8 to 24 carbon atoms) esters of polyhydric alcohols such as sorbitan monolaurate-ethylene oxide adducts (the number of moles added: 1 to 30), and sorbitan monooleate-ethylene oxide adducts (the number of moles added: 1 to 30); and the like.

(E2) includes aliphatic acid (having 8 to 24 carbon atoms) esters of polyhydric alcohols (having 2 to 30 carbon atoms) such as glycerin monostearate, glycerin monooleate, sorbitan monolaurate, and sorbitan monooleate.

(E3) includes lauric acid monoethanolamide, lauric acid diethanolamide, and the like.

Among E), from a viewpoint of cleaning agent's wetting ability for and ability to remove organic matter from the substrate for electronic materials, preferable is (E1), more preferable are alkylene (having 2 to 3 carbon atoms)oxide adducts (average number of moles added: 2 to 20) of higher alcohols, ethylene oxide adducts (average number of moles added: 2 to 20) of phenol or alkylphenol, and alkylene oxide adducts (average number of moles added: 2 to 20) of aliphatic amines having 9 to 18 carbon atoms.

When the cleaning agent of the present invention comprises the nonionic surfactant (E), the content thereof is preferably 0.1 to 10%, more preferably 0.2 to 5%, and particularly preferably 0.3 to 3%, based on the weight of the active ingredients of the cleaning agent of the present invention.

The cleaning agent of the present invention can comprise, in a range in which the effect is not impaired, a surfactant (F) other than the above-mentioned anionic surfactant comprising a sulfonic acid group or a salt thereof (B) and the nonionic surfactant (E). The surfactant (F) includes an anionic surfactant (F1) other than (B), cationic surfactant (F2), and amphoteric surfactant (F3).

(F1) includes a polymeric or low molecular weight anionic surfactant having at least one group selected from the group consisting of a sulfuric acid ester (salt) group, phosphoric acid ester (salt) group, phosphonic acid group (salt), and carboxylic acid (salt) group.

(F2) includes quaternary ammonium salt-type surfactants, amine-type surfactants, and the like.

(F3) includes betaine-type amphoteric surfactants, amino acid-type amphoteric surfactants, amino sulfonic acid-type amphoteric surfactants, and the like.

Among the above-mentioned surfactant (F), from a viewpoint of cleaning ability, preferable is (F1), and more preferable are polyacrylic acid (salt), a salt of methacryloyloxy-polyoxyalkylene sulfuric acid ester/acrylic acid copolymer, and 2-ethylhexanol sulfuric acid ester (salt).

In addition, (F) may be used alone or in combination of two or more kinds.

Furthermore, when the anionic surfactant (F1) forms a salt, the salt includes those comprising the same cationic components as exemplified in the salt of the anionic surfactant (B) described above. These may be used alone or in combination of two or more kinds.

When the cleaning agent of the present invention comprises other surfactant (F), the content thereof is preferably 0.1 to 10%, more preferably 0.2 to 5%, and particularly preferably 0.3 to 3%, based on the weight of the active ingredients of the present invention.

To the cleaning agent of the present invention, there may be added a tri- or more valent polyhydric alcohol for the purpose of improving the cleaning ability. The tri- or more valent polyhydric alcohol includes an aliphatic polyhydric alcohol, dehydration-condensation product of the aliphatic polyhydric alcohol, sugar, sugar alcohol, trisphenol, and the like. Preferable are glycerin, sucrose, and sorbitol.

To the cleaning agent of the present invention, there may be added a reducing agent for the purposes of controlling the etching property of the cleaning agent and preventing recontamination of the substrate due to ions in the cleaning agent. These reducing agents preferably include aldehydes, alkanolamines, phenol compounds, thiol-type reducing agents, oxo acids of sulfur, oxo acids of phosphorus, and the like.

Other additives, which can be added if necessary, include an antioxidant, rust inhibitor, pH adjuster, buffering agent, defoaming agent, preservative, hydrotropic agent, and the like.

In the cleaning agent of the present invention, from a viewpoint of preventing metallic contamination, the respective contents of metals including Na, K, Ca, Fe, Cu, Al, Pb, Ni, and Zn atoms are preferably 20 ppm or less, more preferably 10 ppm or less, and particularly preferably 5 ppm or less, based on the weight of the active ingredients of the cleaning agent.

As a method for measuring the contents of these metal atoms, there can be used heretofore known methods such as, for example, atomic absorption spectrometry, high-frequency inductively coupled plasma (ICP) emission spectrometry, and ICP mass spectrometry.

The cleaning agent of the present invention is an agent for cleaning the electronic materials, wherein the electronic materials, the target of the cleaning, include a magnetic disk substrate (a glass substrate, aluminum substrate, and Ni—P plated aluminum substrate), flat panel display substrate (a glass substrate for liquid crystal display, color filter substrate, array substrate, plasma display substrate, organic EL substrate, and the like), semiconductor substrate (a semiconductor device, silicon wafer, and the like), compound semiconductor substrate (an SiC substrate, GaAs substrate, GaN substrate, AlGaAs substrate, and the like), sapphire substrate (LED and the like), photomask substrate, photovoltaic cell substrate (a silicon substrate, glass substrate for thin-film photovoltaic cell, and the like), optical lens, printed circuit board, optical communication cable, microelectromechanical system (MEMS), quartz oscillator, and the like.

As the electronic materials which become the target of the cleaning, particularly suited are a glass substrate for magnetic disk, glass substrate for flat panel display (a glass substrate for liquid crystal display, glass substrate for plasma display, and glass substrate for organic EL), glass substrate for photomask, optical lens, and glass substrate for thin-film photovoltaic cell.

The substance to be cleaned (contaminant) includes organic matter such as oil (coolant and the like), contaminant from a human body (fingerprint, sebum, and the like), plasticizer (dioctyl phthalate and the like), and organic matter such as organic particles; and inorganic matter such as inorganic particles [abrasive (colloidal silica, alumina, cerium oxide, diamond, etc.), polishing debris (glass cullet, etc.), and the like].

Because the cleaning agent of the present invention has very excellent ability to remove particles, it is preferably used, among the production process of the above-described substrate, in the cleaning step intended to remove particles such as the abrasive, polishing debris, and grinding dust. More specifically, the cleaning agent is preferably applied as a cleaning agent in the cleaning steps after the grinding step and polishing step.

Furthermore, in order to prevent the contaminant suspended in air (particles, organic contaminant, and the like) to adhere firmly on the substrate surface, the substrate may be immersed in the cleaning agent of the present invention before and after the above-mentioned cleaning step.

When a substrate, after polishing with alumina, silica, cerium oxide, diamond, and the like used as the above-mentioned abrasion powder, is chosen as the electronic material to be cleaned, the effect of the cleaning agent of the present invention is particularly readily exhibited.

The cleaning method by using the cleaning agent of the present invention includes ultrasonic cleaning, shower cleaning, spray cleaning, brush cleaning, immersion cleaning, immersion and shaking cleaning, and single substrate cleaning. By any of these methods, the effect of the cleaning agent of the present invention is readily exhibited.

When the cleaning agent of the present invention is used, from a viewpoint of cleaning ability, the cleaning temperature is preferably 10 to 80 C, more preferably 15 to 60 C, and particularly preferably 20 to 50 C.

From a viewpoint of surface flatness of the electronic materials, the surface roughness (Ra) of the electronic material surface, after cleaning with the cleaning agent of the present invention, is preferably 0.5 nm or less, more preferably 0.001 to 0.3 nm, and particularly preferably 0.05 to 0.25 nm.

In addition, the surface roughness (Ra) is measured by using E-sweep produced by SII Nano Technology Inc. under the following conditions.

Measurement mode: DFM (tapping mode)
Scan area: 10 m 10 m
Number of scanning lines: 256 (scanning in Y-direction)
Correction: flat correction in X and Y directions.

The method for producing electronic materials of the present invention is a production method comprising a step of cleaning the electronic materials with the above-described cleaning agent and is particularly suitable as a method for producing a magnetic disk substrate, flat panel display substrate, photomask substrate, optical lens, and photovoltaic cell substrate.

EXAMPLES

Hereinafter, the present invention will be described in more detail with reference to Examples. However, it should be understood that the present invention is not limited to these Examples. In the following, "parts" means "parts by weight." In addition, Mw of the polymers according to GPC in the following were measured under the conditions described above. As the ultrapure water, used was one having electrical resistivity of 18 M cm or higher.

Production Example 1

To a reaction vessel equipped with a stirrer, temperature controller, and reflux condenser was added 100 parts of ethylene dichloride. After replacing the atmosphere with nitrogen, the content was heated under stirring to 90 C to reflux of ethylene dichloride. To the reaction vessel, 120 parts of styrene and an initiator solution comprising 1.7 parts of 2,2'-azobisisobutyronitrile dissolved beforehand in 20 parts of ethylene dichloride were dropwise added simultaneously and each independently over 6 hours. After the dropwise addition was complete, polymerization was carried out for further. 1 hour. After the polymerization, the reaction mixture was cooled to 20 C under nitrogen seal. Thereafter, while controlling the temperature at 20 C, 105 parts of sulfuric anhydride was added dropwise over 10 hours and, after completion of the dropwise addition, the sulfonation reaction was continued for further 3 hours. After the reaction, the solvent was distilled off and the residue was allowed to solidify. Thereafter, the solid was dissolved by addition of 345 parts of ultrapure water to obtain an aqueous solution of polystyrenesulfonic acid. The aqueous solution of polystyrenesulfonic acid obtained was neutralized with a 40% aqueous sodium hydroxide solution (ca. 110 parts) to pH 7 and the concentration was adjusted with ultrapure water to thereby obtain a 40% aqueous solution of sodium polystyrenesulfonate (B-1), a polymeric anionic surfactant. In addition, the Mw and degree of sulfonation of (B-1) was 40,000 and 97%, respectively.

Production Example 2

To a reaction vessel equipped with a stirrer and temperature controller were added 21 parts of naphthalenesulfonic acid and 10 parts of ultrapure water. While keeping the temperature of the system at 80 C under stirring, 8 parts of 37% formaldehyde was added dropwise over 3 hours. After completion of the dropwise addition, the reaction mixture was heated to 105 C and the reaction was continued for 25 hours. Thereafter, the reaction mixture was cooled to room temperature (ca. 25 C) and, while keeping the temperature at 25 C in a water bath, DBU was added gradually to adjust the pH to 6.5 (ca. 15 parts of DBU was used). The solid content was adjusted to 40% by addition of ultrapure water to thereby obtain a 40% aqueous solution of a DBU salt of naphthalenesulfonic acid-formalin condensate (B-2), a polymeric anionic surfactant. In addition, the Mw of (B-2) was 5,000.

Production Example 3

To a reaction vessel equipped with a stirrer and temperature controller were added 300 parts of isopropyl alcohol and 100 parts of ultrapure water. After replacing the atmosphere with nitrogen, the content was heated to 75 C. Under stirring, to the reaction vessel were simultaneously added dropwise 436 parts of a 70% aqueous monomer solution, comprising 227 parts of acrylamide-2-methylpropanesulfonic acid, 78 parts of acrylic acid, and 131 parts of ultrapure water, and 95 parts of a 15% isopropyl alcohol solution of dimethyl-2,2'-azobisisobutyrate over 3.5 hours. After the dropwise addition was complete, the reaction mixture was stirred at 75 C for 5 hours. Thereafter, while adding ultrapure water intermittently so that the content would not solidify, a mixture of water and isopropyl alcohol was distilled off until isopropyl alcohol could not be detected. To the aqueous solution of acrylamide-2-methylpropanesulfonic acid/acrylic acid copolymer obtained, DBU was gradually added while controlling the temperature at 25 C to adjust the pH to 6.5 (ca. 280 parts of DBU was used). By adjusting the concentration with ultrapure water, there was obtained a 40% aqueous solution of a DBU salt of acrylamide-2-methylpropanesulfonic acid/acrylic acid copolymer (B-3), a polymeric anionic surfactant. In addition, the Mw of (B-3) was 8,000

Production Example 4

Except that 2-amino-2-methyl-1-propanol was used instead of the 40% aqueous sodium hydroxide solution, which was used in Production Example 1, to neutralize the aqueous polymer solution to pH 6, production was carried out in the same manner as in Production Example 1 to obtain a 40% aqueous solution of a 2-amino-2-methyl-1-propanol salt of polystyrenesulfonic acid (B-4), a polymeric anionic surfactant. In addition, the Mw of (B-4) was 40,000 and the degree of sulfonation was 97%.

Production Example 5

Except that DBN was used instead of DBU, which was used in Production Example 2, to neutralize the aqueous polymer solution to pH 7, production was carried out in the same manner as in Production Example 2 to obtain a 40% aqueous solution of a DBN salt of naphthalenesulfonic acid-formalin condensate (B-5), a polymeric anionic surfactant. In addition, the Mw of (B-5) was 5,000.

Production Example 6

Except that 2-methyl-1H-imidazole was used instead of DBU, which was used in Production Example 3, to neutralize the aqueous polymer solution to pH 7, production was carried out in the same manner as in Production Example 3 to obtain a 40% aqueous solution of a 2-methyl-1H-imidazole salt of acrylamide-2-methylpropanesulfonic acid/acrylic acid copolymer (B-6), a polymeric anionic surfactant. In addition, the Mw of (B-6) was 8,000.

Production Example 7

To a beaker were added 136 parts of octylbenzenesulfonic acid and 245 parts of ultrapure water, and the mixture was dissolved to a homogeneous solution. By neutralizing the obtained aqueous solution of octylbenzenesulfonic acid to pH 7 by gradually adding DBN (ca. 65 parts) and by adjusting the concentration with ultrapure water, there was obtained a 40% aqueous solution of a DBN salt of octylbenzenesulfonic acid (B-7), an anionic surfactant.

Production Example 8

To a pressure-resistant reaction vessel equipped with a stirrer and temperature controller, 186 parts (1.0 mole part) of lauryl alcohol and 0.5 part of potassium hydroxide were added and the mixture was dehydrated at 100 C for 30 minutes under reduced pressure of 30 mmHg or below. While keeping the reaction temperature at 160 C, 396 parts (9.0 mole parts) of ethylene oxide was added dropwise over 3 hours and the reaction mixture was aged at 160 C for 2 hours to obtain crude polyether in a liquid form. This crude polyether was cooled to ca. 80 C and thereto were added 6 parts of ultrapure water and 100 parts of a cation exchange resin {Amberlite IR120B (I) produced by Organo Corporation}. After stirring at room temperature (ca. 20 C) for 30 minutes, the polyether was filtered under reduced pressure and dehydrated to obtain an ethylene oxide 9 moles adduct of lauryl alcohol (E-1), a nonionic surfactant.

Production Example 9

To a pressure-resistant reaction vessel equipped with a stirrer and temperature controller, 296 parts (1.6 mole parts) of laurylamine was added and, after replacing the atmosphere with argon gas, the vessel was evacuated and the content was heated to 95 C. At the same temperature, 140.8 parts (3.2 mole parts; 2.0 mole parts per 1 mole part of the amine) of ethylene oxide was added dropwise gradually, so that the inner pressure of the pressure-resistant reaction vessel did not exceed 0.3 MPa. After an induction period of ca. 1.5 hours, the reaction was carried out for a total of 4 hours while controlling the temperature in a range of 90 to 110 C. After completion of the dropwise addition, the reaction was continued at 95 C for 30 minutes until the inner pressure of the pressure-resistant reaction vessel showed the same pressure as that at the start of the dropwise addition.

To the ethylene oxide 2.0 moles adduct of laurylamine (X-1) obtained, 0.8 part [0.183% of active ingredient relative to (X-1)] of tetramethylethylenediamine was added with care so that air did not get mixed therewith and the mixture was dehydrated under reduced pressure at 95 C for 1 hour. The temperature was lowered to 70 C and, thereafter, 563.2 parts (12.8 mole parts: 8.0 mole parts relative to 1 mole part of the amine) of ethylene oxide was added dropwise over 3 hours so that the inner pressure of the pressure-resistant reaction vessel did not exceed 0.2 MPa, while controlling the temperature in a range of 70 to 90 C. After completion of the dropwise addition, the reaction was continued at 70 C for 30 minutes until the inner pressure of the pressure-resistant reaction vessel showed the same pressure as that at the start of the dropwise addition to obtain an ethylene oxide 10 moles adduct of laurylamine (E-2), a nonionic surfactant.

Comparative Production Example 1

To a reaction vessel equipped with a stirrer and temperature controller were added 300 parts of isopropyl alcohol and 100 parts of ultrapure water. After replacing the atmosphere with nitrogen, the content was heated to 75 C. Under stirring, to the reaction vessel were simultaneously added dropwise 407 parts of a 75% aqueous acrylic acid solution and 95 parts of a 15% dimethyl 2,2'-azobisisobutyrate solution in isopropyl alcohol over 3.5 hours. After the dropwise addition was complete, the reaction mixture was stirred at 75 C for 5 hours. Thereafter, while adding ultrapure water intermittently so that the content did not solidify, a mixture of water and isopropyl alcohol was distilled off until isopropyl alcohol could not be detected. The aqueous solution of polyacrylic acid obtained was neutralized with DBU (ca. 450 parts) to pH 7 and the concentration was adjusted with ultrapure water to thereby obtain a 40% aqueous solution of a DBU salt of polyacrylic acid (F-1), a nonionic surfactant. In addition, the Mw of (F-1) was 10,000.

Comparative Production Example 2

Except that a 40% aqueous sodium hydroxide solution was used instead of DBU, which was used in Comparative Production Example 1, to neutralize the aqueous polymer solution to pH 7, production was carried out in the same manner as in Comparable Production Example 1 to obtain a 40% aqueous solution of sodium polyacrylate (F-2), an anionic surfactant. In addition, the Mw of (F-2) was 10,000.

Examples 1 to 15 and Comparative Examples 1 to 8

By using a beaker, the respective components described in Table 1 and Table 2 were mixed homogeneously at 20 C in the blending amounts (in parts) described in Table 1 and Table 2 to prepare the cleaning agents of Examples 1 to 15 and Comparative Examples 1 to 8. It is noted, however, that the amounts (in parts) of (A) to (E) described in Table 1 and Table 2 represent the amounts (in parts) of the active ingredients, while the amount (in parts) of ultrapure water comprises water contained in (B-1) to (B-7), (F-1), and (F-2).

In addition, abbreviations of components which appear in Table 1 and Table 2 are as follows.
DTPA: diethylenetriamine pentaacetic acid
HEDP: 1-hydroxyethylidene-1,1-diphosphonic acid
EDTMP: ethylenediaminetetra(methylenephosphonic acid)
DEGB: diethyleneglycol monobutyl ether
TEGM: triethyleneglycol monomethyl ether <Physical Property Measurement and Performance Evaluation>

The cleaning agents of Examples 1 to 15 and Comparative Examples 1 to 8 were diluted 20 times with ultrapure water in advance to be used as the test cleaning agents. The pH, cleaning ability test (1), cleaning ability test (2), dispersing ability, metal corrosive property, foaming property, rinse-off property, and wetting ability were measured and evaluated by the following methods. Furthermore, as to stability against dilution with hard water, the cleaning agents of Examples 1 to 15 and Comparative Examples 1 to 8 were used as they were. The results of the measurements and evaluations are shown in Table 1 and Table 2.

TABLE 1

| | | Example | | | | | | | | |
|---|---|---|---|---|---|---|---|---|---|---|
| | | 1 | 2 | 3 | 4 | 5 | 6 | 7 | 8 | 9 |
| Amount of cleaning agent components (wt. parts) | Sulfamic acid (A) | 1.0 | 2.0 | 5.0 | 2.0 | 2.0 | 2.0 | 2.0 | 2.0 | 3.0 |
| | Oxalic acid | — | — | — | — | — | — | — | — | — |
| | Sulfuric acid | — | — | — | — | — | — | — | — | — |
| | (B) (B-1) | 0.2 | — | — | 0.5 | — | 0.5 | 0.2 | — | — |
| | (B-2) | — | 0.5 | — | — | — | — | — | 0.5 | — |
| | (B-3) | — | — | 0.2 | — | 0.5 | — | — | — | — |
| | (B-4) | — | — | — | — | — | — | — | — | 1.0 |
| | (B-5) | — | — | — | — | — | — | — | — | — |
| | (B-6) | — | — | — | — | — | — | — | — | — |
| | (B-7) | — | — | — | — | — | — | 0.5 | — | — |
| | (C) DTPA | 0.1 | — | — | — | — | 0.05 | 0.1 | — | 0.1 |
| | HEDP | — | — | 1.0 | 1.0 | — | 1.0 | — | 2.0 | 1.0 |
| | EDTMP | — | 1.0 | — | — | 1.0 | — | — | — | — |
| | (D) DEGB | — | — | — | — | — | — | 5.0 | — | 2.0 |
| | TEGM | — | — | — | — | — | — | — | 5.0 | — |
| | (E) (E-1) | — | — | — | 0.1 | — | — | 0.1 | 0.1 | 0.2 |
| | (E-2) | — | — | — | — | 0.1 | — | — | — | — |
| | Ultrapure water | 98.7 | 96.5 | 93.8 | 96.4 | 96.4 | 96.5 | 92.1 | 90.4 | 92.7 |
| Evaluation results | pH | 2.0 | 1.5 | 1.0 | 1.5 | 1.5 | 1.5 | 2.0 | 1.5 | 1.5 |
| | Cleaning (1) | Exc | Exc | Exc | Exc | Exc | Exc | Exc | Exc | Exc |

TABLE 1-continued

|  |  | | | | | | | | |
|---|---|---|---|---|---|---|---|---|---|
| Cleaning (2) | Exc | Exc | Exc | Exc | Exc | Exc | Exc | Exc | Exc |
| Dispersing | Good | Good | Good | Exc | Exc | Good | Exc | Exc | Exc |
| Metal corrosiveness (ppm) | 0.10 | 0.07 | 0.10 | 0.06 | 0.06 | 0.05 | 0.05 | 0.04 | 0.05 |
| Hard water dilution | Exc | Exc | Exc | Exc | Exc | Exc | Exc | Exc | Exc |
| Foaming (ml) (0 min/1 min) | 3/0 | 5/0 | 3/0 | 10/5 | 15/10 | 5/0 | 45/42 | 10/5 | 15/10 |
| Rinse-off (mg) | 0.03 | 0.03 | 0.03 | 0.04 | 0.05 | 0.03 | 0.02 | 0.01 | 0.02 |
| Wetting (contact angle) | 6.5 | 7.0 | 7.1 | 2.1 | 3.6 | 6.7 | 2.5 | 2.6 | 2.0 |

|  |  |  |  | Example | | | | | |
|---|---|---|---|---|---|---|---|---|---|
|  |  |  |  | 10 | 11 | 12 | 13 | 14 | 15 |
| Amount of cleaning agent components (wt. parts) | Sulfamic acid (A) | | | 3.0 | 3.0 | 3.0 | 2.0 | 5.0 | 2.0 |
| | Oxalic acid | | | — | — | — | — | — | — |
| | Sulfuric acid | | | — | — | — | — | — | — |
| | (B) | (B-1) | | — | — | 1.0 | 1.0 | 1.0 | — |
| | | (B-2) | | — | — | 0.5 | — | — | — |
| | | (B-3) | | — | — | — | — | 1.0 | — |
| | | (B-4) | | — | — | — | — | — | 1.0 |
| | | (B-5) | | 2.0 | — | — | — | — | 0.5 |
| | | (B-6) | | — | 1.0 | — | — | — | — |
| | | (B-7) | | — | — | — | — | — | — |
| | (C) | DTPA | | 0.1 | — | 0.1 | 0.5 | 0.1 | 0.1 |
| | | HEDP | | — | 2.0 | 3.0 | 3.0 | 5.0 | — |
| | | EDTMP | | 1.0 | 1.0 | — | — | — | 5.0 |
| | (D) | DEGB | | — | 5.0 | — | 5.0 | 5.0 | 10.0 |
| | | TEGM | | 2.0 | — | — | — | — | — |
| | (E) | (E-1) | | — | 0.3 | 0.1 | 0.1 | — | 0.5 |
| | | (E-2) | | 0.1 | — | — | — | 0.1 | — |
| | Ultrapure water | | | 91.8 | 87.7 | 92.3 | 88.4 | 82.8 | 80.9 |
| Evaluation results | pH | | | 1.5 | 1.5 | 1.5 | 1.7 | 1.0 | 1.6 |
| | Cleaning (1) | | | Exc | Exc | Exc | Exc | Exc | Exc |
| | Cleaning (2) | | | Exc | Exc | Exc | Exc | Exc | Exc |
| | Dispersing | | | Exc | Exc | Exc | Exc | Exc | Exc |
| | Metal corrosiveness (ppm) | | | 0.05 | 0.04 | 0.08 | 0.12 | 0.10 | 0.04 |
| | Hard water dilution | | | Exc | Exc | Exc | Exc | Exc | Exc |
| | Foaming (ml) (0 min/1 min) | | | 15/10 | 20/15 | 10/5 | 10/5 | 15/10 | 25/20 |
| | Rinse-off (mg) | | | 0.02 | 0.02 | 0.04 | 0.01 | 0.02 | 0.01 |
| | Wetting (contact angle) | | | 3.0 | 1.8 | 2.0 | 2.3 | 2.2 | 1.8 |

TABLE 2

|  |  |  | Comparative Example | | | | | | | |
|---|---|---|---|---|---|---|---|---|---|---|
|  |  |  | 1 | 2 | 3 | 4 | 5 | 6 | 7 | 8 |
| Amount of cleaning agent component (wt. parts) | Sulfamic acid (A) | | 2.0 | 2.0 | 2.0 | 2.0 | — | — | 2.0 | 2.0 |
| | Oxalic acid | | — | — | — | — | 2.0 | — | — | — |
| | Sulfuric acid | | — | — | — | — | — | 2.0 | — | — |
| | (B) | (B-1) | 0.2 | — | — | — | 0.2 | — | — | — |
| | | (B-2) | — | 0.5 | — | — | — | 0.5 | — | — |
| | | (B-3) | — | — | — | — | — | — | — | — |
| | | (B-4) | — | — | — | — | — | — | — | — |
| | | (B-5) | — | — | — | — | — | — | — | — |
| | | (B-6) | — | — | — | — | — | — | — | — |
| | | (B-7) | — | — | — | — | — | — | — | — |
| | (C) | DTPA | — | — | 0.1 | — | 0.1 | — | 0.5 | — |
| | | HEDP | — | — | — | 1.0 | — | — | — | 1.0 |
| | | EDTMP | — | — | — | — | — | 1.0 | — | — |
| | (D) | DEGB | — | — | — | — | — | — | — | — |
| | | TEGM | — | — | — | — | — | — | — | — |
| | (E) | (E-1) | — | — | — | — | — | — | — | — |
| | | (E-2) | — | — | — | — | — | — | — | — |
| | (F) | (F-1) | — | — | — | — | — | — | 0.2 | — |
| | | (F-2) | — | — | — | — | — | — | — | 0.5 |
| | Ultrapure water | | 97.8 | 97.5 | 97.9 | 97.0 | 97.7 | 96.5 | 97.3 | 96.5 |
| Evaluation results | pH | | 2.0 | 2.0 | 1.8 | 1.5 | 2.0 | 1.5 | 1.8 | 1.6 |
| | Cleaning (1) | | Bad | Bad | Bad | Bad | Good | Good | Bad | Bad |
| | Cleaning (2) | | Poor | Poor | Poor | Poor | Good | Good | Poor | Poor |

TABLE 2-continued

|  | Comparative Example | | | | | | | |
| --- | --- | --- | --- | --- | --- | --- | --- | --- |
|  | 1 | 2 | 3 | 4 | 5 | 6 | 7 | 8 |
| Dispersing | Bad | Bad | Bad | Bad | Good | Good | Bad | Bad |
| Metal corrosiveness (ppm) | 0.03 | 0.03 | 0.05 | 0.05 | 0.21 | 0.35 | 0.05 | 0.04 |
| Hard water dilution | Exc | Exc | Exc | Exc | Bad | Good | Exc | Good |
| Foaming (ml) (0 min/1 min) | 3/0 | 5/0 | 2/0 | 2/0 | 3/0 | 5/0 | 5/0 | 5/0 |
| Rinse-off (mg) | 0.01 | 0.01 | 0.01 | 0.02 | 0.02 | 0.01 | 0.03 | 0.05 |
| Wetting (contact angle) | 8.4 | 7.8 | 7.5 | 7.0 | 7.8 | 7.2 | 7.1 | 7.8 |

<pH Measurement>

The pH was measured by using a pH meter (produced by Horiba, Ltd.: M-12) at a measurement temperature of 25 C.

<Cleaning Ability Test (1)>

A contaminated substrate was prepared by polishing a 2.5-inch glass substrate for magnetic disk by using a commercially available colloidal silica slurry (average particle size: ca. 30 nm) and abrasive cloth, followed by blowing with nitrogen. In a glass beaker was placed 1,000 parts of the test cleaning agent, the contaminated substrate prepared was immersed therein, and cleaning was carried out in an ultrasonic washing machine (200 kHz) at 30 C for 5 minutes. After the cleaning, the substrate was taken out, rinsed thoroughly with ultrapure water, dried thereafter by blowing with nitrogen, and cleanliness of the substrate surface was evaluated by a differential interference microscope (produced by Nikon Corporation: OPTIPHOT-2, magnification of 400 times) according to the following criteria. In addition, this evaluation was conducted in a clean room of class 1,000 (HED-STD-209D: U.S. Federal Standard, 1988) in order to prevent contamination from the air.

Exc(ellent): Removal efficiency was ca. 90% or more
Good: Removal efficiency was ca. 70% to 90%
Poor: Removal efficiency was ca. 50% to 70%
Bad: Removal efficiency was less than ca. 50%

<Cleaning Ability Test (2)>

Except that a commercial cerium oxide slurry (average particle size: ca. 250 nm) was used as the abrasive, cleanliness of the substrate surface was evaluated by the same evaluation method and criteria as in the Cleaning ability test (1).

<Dispersing Ability>

Into a glass vessel were weighed 10 g of the cerium oxide slurry used in the evaluation of Cleaning ability test (2) and 90 g of the test cleaning agent. The slurry in the vessel was dispersed by irradiating ultrasonic wave at 30 C for 30 minutes by using the ultrasonic washing machine (200 kHz). The sample was taken out of the ultrasonic washing machine, allowed to stand at room temperature (23 C), and evaluated according to the following criteria.

Exc(ellent): Dispersion state is maintained for 5 days or more
Good: Dispersion state is maintained for 3 to 4 days
Poor: Dispersion state is maintained for 1 to 2 days
Bad: Dispersion separates in less than 1 day <Metal Corrosive Property>

In a polypropylene vessel was placed 100 parts of the test cleaning agent and therein was immersed a stainless steel test piece (made of SUS 304, size: 5 cm 2.5 cm, thickness: 0.1 cm). The vessel was stoppered tightly and was left to stand in a room with the temperature controlled at 23 C for 3 days. Thereafter, the content (ppm) of iron ions dissolved in the solution was analyzed by using a high-frequency inductively coupled plasma (ICP) emission spectrometer (produced by Varian, Inc.; Varian 730-ES). The less the amount dissolved, the lower is the metal-corrosive property. In addition, before the present test, the contents of iron ions in all test cleaning agents were below the detection limit (0.02 ppm).

<Stability Against Dilution with Hard Water>

In 1,000 parts of ultrapure water were dissolved 3.3 parts of calcium chloride dihydrate (produced by Wako Pure Chemicals Ind., Ltd.) and 1.5 parts of magnesium chloride hexahydrate (produced by Wako Pure Chemicals Ind., Ltd.) to prepare artificial hard water. Using this artificial hard water, the test cleaning agent was diluted to 20 times its weight. Evaluation was conducted visually according to the following criteria. When no turbidity is formed, stability against dilution with hard water is high.

Exc(ellent): Transparent
Good: Virtually transparent
Bad: Turbid

<Foaming Property Immediately after Shaking and Defoaming Property after 1 Minute>

Into a 100 mL stoppered measuring cylinder made of glass (one with a size specified as a stoppered measuring cylinder by JIS R3504, "Glass Material for Chemical Analysis"), there was placed 20 mL of the test cleaning agent. After adjusting the temperature to 25 C in a constant temperature water bath, the stoppered measuring cylinder was plugged, shaken up and down vigorously 60 times in 30 seconds, and the respective volumes (mL) of the foam immediately after shaking and that after 1 minute was measured. The less the volume of foam immediately after shaking, the lower is the foaming property and, the less the volume of foam after 1 minute, the higher is the defoaming property.

<Rinse-Off Property>

The weight (g) of a 2.5-inch glass substrate for magnetic disk to be used in the test was measured to the five decimal places. Into a 1 L beaker was placed 1 L of the test cleaning agent and, after adjusting the temperature to 25 C in a constant temperature water bath, the above weighed glass substrate was immersed completely therein. After immersion for 30 seconds, the substrate was taken out quickly and was immersed in a 1 L of ultrapure water for 5 seconds. Thereafter, the substrate was suspended in air at 25 C and allowed to dry naturally for ca. 30 minutes. The substrate after drying was weighed and the rinse-off property (mg) was evaluated by calculation according to the following formula. The smaller the value (the smaller the residual amount of cleaning agent on the substrate), the higher is the rinse-off property.

Rinse-off property (mg)=[substrate weight after the test (g)−substrate weight before the test (g)]$10^{-3}$ <Wetting Ability>

The contact angle (25 C, after 10 seconds) of the test cleaning agent on a 2.5-inch glass substrate for magnetic disk was measured by using a fully automatic contact angle meter (produced by Kyowa Kaimen Kagaku Co., Ltd.: PD-W). The smaller contact angle shows the higher wetting ability of the cleaning agent for the substrate.

From the results of Tables 1 and 2, it can be seen that every cleaning agent of the present invention in Examples 1 to 15 has excellent ability to remove particles which adhered on the electronic materials. In addition, because the cleaning agent of the present invention also has excellent dispersing ability for particles such as the abrasive, it can be anticipated that the cleaning agent is also excellent in preventing readhesion of the particles during cleaning. Further, because the cleaning agent of the present invention has less metal-corrosive property compared to the cleaning agents comprising acids other than sulfamic acid, which are used in Comparative Examples 5 and 6, there is no fear that the cleaning agent of the present invention may corrode the metal used for the washing machine and the like. Furthermore, because the cleaning agent of the present invention has high stability against dilution with hard water, there is no fear of precipitate formation even when the cleaning agent is diluted with metal ion-containing water such as general industrial water; thus, the cleaning agent of the present invention has also an effect that it provides an excellent handling characteristics. Also, in the Examples, the cleaning agent which uses the hydrophilic solvent (D) (Examples 7 to 11 and Examples 13 to 15) further shows good rinse-off property and the cleaning agent which use the nonionic surfactant (E) (Examples 4 and 5 and Examples 7 to 15) has good wetting ability for the substrate. Thus, in actual use of the cleaning agent, an effect of saving cleaning and rinsing time can be expected.

INDUSTRIAL APPLICABILITY

The cleaning agent for electronic materials and the cleaning method of the present invention can be suitably used in cleaning, which is aimed at the particles (abrasive grain, glass powder, ceramic powder, metal powder, etc.) and the like.

Therefore, the cleaning agent for electronic materials and the cleaning method of the present invention can be used in the cleaning step in the production process of various electronic materials. The electronic materials include, for example, a magnetic disk substrate (an aluminum substrate, Ni—P substrate, glass substrate, magnetic disk, magnetic head, and the like), flat panel display substrate (a glass substrate for liquid crystal display, color filter substrate, array substrate, plasma display substrate, organic EL substrate, and the like), semiconductor substrate (a semiconductor device, silicon wafer, and the like), compound semiconductor substrate (an SiC substrate, GaAs substrate, GaN substrate, AlGaAs substrate, and the like), sapphire substrate (a LED and the like), photomask substrate, photovoltaic cell substrate (a single-crystal silicon substrate, polycrystalline silicon substrate, thin-film photovoltaic cell substrate, single-crystal compound substrate, polycrystalline compound substrate, organic photovoltaic cell substrate), optical lens, printed circuit board, optical communication cable, microelectromechanical system (MEMS), and the like. In particular, the cleaning agent for electronic materials of the present invention is suitable when the electronic materials are a glass substrate for magnetic disk, glass substrate for flat panel display, glass substrate for photomask, optical lens, or glass substrate for thin-film photovoltaic cell.

The invention claimed is:

1. A cleaning agent for electronic materials, consisting of:
   sulfamic acid (A),
   an anionic surfactant having at least one sulfonic acid group or a salt thereof in the molecule (B),
   a chelating agent (C),
   optionally, a hydrophilic solvent (D),
   optionally, a nonionic surfactant (E), and
   water as essential components,
   wherein pH at 25° C. is not more than 3.0,
   wherein a content of the sulfamic acid (A) is 5 to 90 weight %, a content of the anionic surfactant (B) is 0.1 to 50 weight %, and a content of the chelating agent (C) is 0.1 to 50 weight %, a content of the nonionic surfactant (E) is 0 to 10 weight %, based on a total weight of active ingredients of the cleaning agent.

2. The cleaning agent for electronic materials according to claim 1, wherein a weight ratio of (B) relative to (C), [(B)/(C)], is preferably 0.1 to 7.

3. The cleaning agent for electronic materials according to claim 1, wherein the (B) is a polymeric anionic surfactant (B1) having a weight average molecular weight of 1,000 to 2,000,000.

4. The cleaning agent for electronic materials according to claim 3, wherein the (B1) is at least one selected from a group consisting of polystyrenesulfonic acid, poly {2-(meth)acryloylamino-2,2-dimethylethanesulfonic acid}, 2-(meth)acryloylamino-2,2-dimethylethanesulfonic acid/(meth)acrylic acid copolymer, naphthalenesulfonic acid-formaldehyde condensate, and salts thereof.

5. The cleaning agent for electronic materials according to claim 1, wherein the (C) is at least one selected from a group consisting of aminopolycarboxylic acid, hydroxycarboxylic acid, phosphonic acid, condensed phosphoric acid, and salts thereof.

6. The cleaning agent for electronic materials according to claim 1, further comprising a nonionic surfactant (E).

7. The cleaning agent for electronic materials according to claim 1, wherein the electronic materials are substrates after being polished with silica, alumina, or diamond used as an abrasive.

8. The cleaning agent for electronic materials according to claim 1, wherein the electronic material is a glass substrate for magnetic disk, glass substrate for flat panel display, glass substrate for photomask, optical lens, glass substrate for thin-film photovoltaic cell, or semiconductor substrate.

9. A method for producing electronic materials, comprising a step of cleaning the electronic materials by using the cleaning agent according to claim 1.

10. The cleaning agent for electronic materials according to claim 1, wherein the cleaning agent for electronic materials, consisting of
   the sulfamic acid (A),
   the anionic surfactant (B),
   the chelating agent (C),
   optionally, the hydrophilic solvent (D),
   the nonionic surfactant (E), and
   water
wherein the content of the nonionic surfactant (E) is 0.1 to 10 weight %, based on the total weight of active ingredients of the cleaning agent.

11. The cleaning agent for electronic materials according to claim 10, wherein the cleaning agent for electronic materials, consisting of
   the sulfamic acid (A),
   the anionic surfactant (B),
   the chelating agent (C),
   the hydrophilic solvent (D),
   the nonionic surfactant (E), and
   water.

12. The cleaning agent for electronic materials according to claim 11, further comprising a hydrophilic solvent (D), wherein a content of the hydrophilic solvent (D) is 1 to 70 weight %, based on a total weight of active ingredients of the cleaning agent.

* * * * *